United States Patent [19]

Kao

[11] Patent Number: 5,501,506
[45] Date of Patent: Mar. 26, 1996

[54] BICYCLE SADDLE ADJUSTMENT STRUCTURE

[76] Inventor: Yu-Ju Kao, 2, Alley 1, Lane 29, Sec. 2, Pei-Shin Rd., Shin-Tien City, Taipei Hsien, Taiwan

[21] Appl. No.: 239,976

[22] Filed: May 9, 1994

[30] Foreign Application Priority Data

May 11, 1993 [TW] Taiwan ................................ 82216181

[51] Int. Cl.$^6$ ..................................................... B62J 1/00
[52] U.S. Cl. ........................................ 297/215.15; 403/389
[58] Field of Search ........................ 297/215.15, 215.14; 403/391, 389, 390

[56] References Cited

U.S. PATENT DOCUMENTS

| 2,920,911 | 1/1960 | Campagnolo | 403/389 X |
| 3,891,333 | 6/1975 | Corderac'k | 297/215.15 X |
| 4,275,922 | 6/1981 | Juy | 297/215.14 |
| 4,421,357 | 12/1983 | Shimano | 297/215.15 X |
| 4,783,119 | 11/1988 | Moses . | |
| 5,190,346 | 3/1993 | Ringle | 297/215.15 |
| 5,383,706 | 1/1995 | Chen | 297/215.15 |

FOREIGN PATENT DOCUMENTS

| 777118 | 11/1934 | France | 403/391 |
| 2233216 | 1/1975 | France | 297/215.15 |
| 607186 | 8/1960 | Italy | 297/215.15 |

Primary Examiner—Peter M. Cuomo
Assistant Examiner—David E. Allred
Attorney, Agent, or Firm—Bacon & Thomas

[57] ABSTRACT

A bicycle saddle adjustment structure based primarily on holding the seat post into position by a pair of H-shaped lower and upper clamps with a pair of flanges on their two sides. The lower clamp has a curved bottom engaging a curved slot of the base which is installed above the seat post. A pair of keys on two sides of the lower clamp interlock with respective recesses two sides of the curved slot of the base. A pair of bolts are threaded through a hole and an open slot of the front and rear parts of the base and into threaded holes of the upper clamp.

1 Claim, 4 Drawing Sheets

BICYCLE SADDLE ADJUSTMENT STRUCTURE

BACKGROUND OF THE INVENTION (a) Field of the Invention

The present invention relates to a bicycle saddle adjustment structure, more particularly a bicycle saddle adjustment structure installed above the seat post of a bicycle.

(b) Description of the Prior Art

The conventional bicycle saddle adjustment structure is based on two clamps mounted above the seat post and secured by bolts to a pair of rails underneath the saddle. The design involves a complicated process of saddle assembly and adjustment, which lowers efficiency in racing and in mass production. As a result, some manufacturers attempt to improve the saddle adjustment structure. One of such attempts is the U.S. Pat. No. 4,783,119 "Lightweight Adjustable Bicycle Saddlemount" which describes installing a crosspin (25) suitably on the post (1). On top of the post is a recess (6) for accommodating a semispool (3). The semispool (3) and a pair of clamps (4) mounted on it are used to secure the two rails (18) under the saddle. Two bolts (5) are threaded through the lower part of holes (9) at the front and rear parts of the crosspin (25) to the female thread (20) of the two clamps (4). This design provides spherical contact between the central core (12) of the semispool (3) and the recess (6) to enable for-and-aft saddle adjustment. However, the angular adjustment is restricted by the confinement of the two bolts (5) in the holes (9). Only a small adjustment is allowed. If the holes (9) are too big, the semispool (3) would be loose. If the holes (9) are too small, it will be almost impossible to adjust the angle. As a result, the patent is very inconvenient in application. Furthermore, completion of the saddle assembly or adjustment must rely on turning, adjusting and screwing the two bolts (5) threaded through the holes (9) at the front and rear parts of the crosspin (25), which is very time consuming. Besides, when the saddle has to be adjusted, the two bolts (5) cannot restrain each other because the two clamps (4) on the semispool (3) are separated into front and back parts. Therefore, it is difficult to adjust the bolts (5) to exert parallel forces to the front and rear parts of the semispool (3). Saddle adjustment is therefore very inconvenient.

SUMMARY OF THE INVENTION

The main object according to the present invention is to provide a bicycle saddle adjustment structure which uses a pair of H-shaped upper and lower clamps to hold in position the rails underneath the saddle. The center of the upper and lower clamps and the base above the seat post are curved for a perfect fit. The base and the upper clamp are locked tightly by a pair of bolts. The present invention provides an improve saddle adjustment design that allows easier and more convenient assembly and adjustment for racing and mass production.

Another object of the present invention is to provide a bicycle seat adjustment structure that separates the upper clamp and the base by unscrewing the bolts between the base and the upper clamp. When the bolts are disengaged from an open slot on the protruding side of the base, the base and the upper clamp may be separated. This new design also adds convenience to saddle assembly and adjustment.

Yet another object of the present invention is to provide a saddle adjustment structure that enables recesses on two sides of an inner wall of the curved slot of the base and keys on two sides of the lower clamp to be interlocked. As a result, the adjustment is safety confined in such a way as not to exceed an optimum tilting angle indeed a safety device also.

BRIEF DESCRIPTION OF THE DRAWINGS

The drawings disclose an illustrative embodiment of the present invention which serves to exemplify the various advantages and objects thereof, and are as follows.

DETAILED DESCRIPTION OF THE PREFERRED EMBODIMENT

Figure 1:
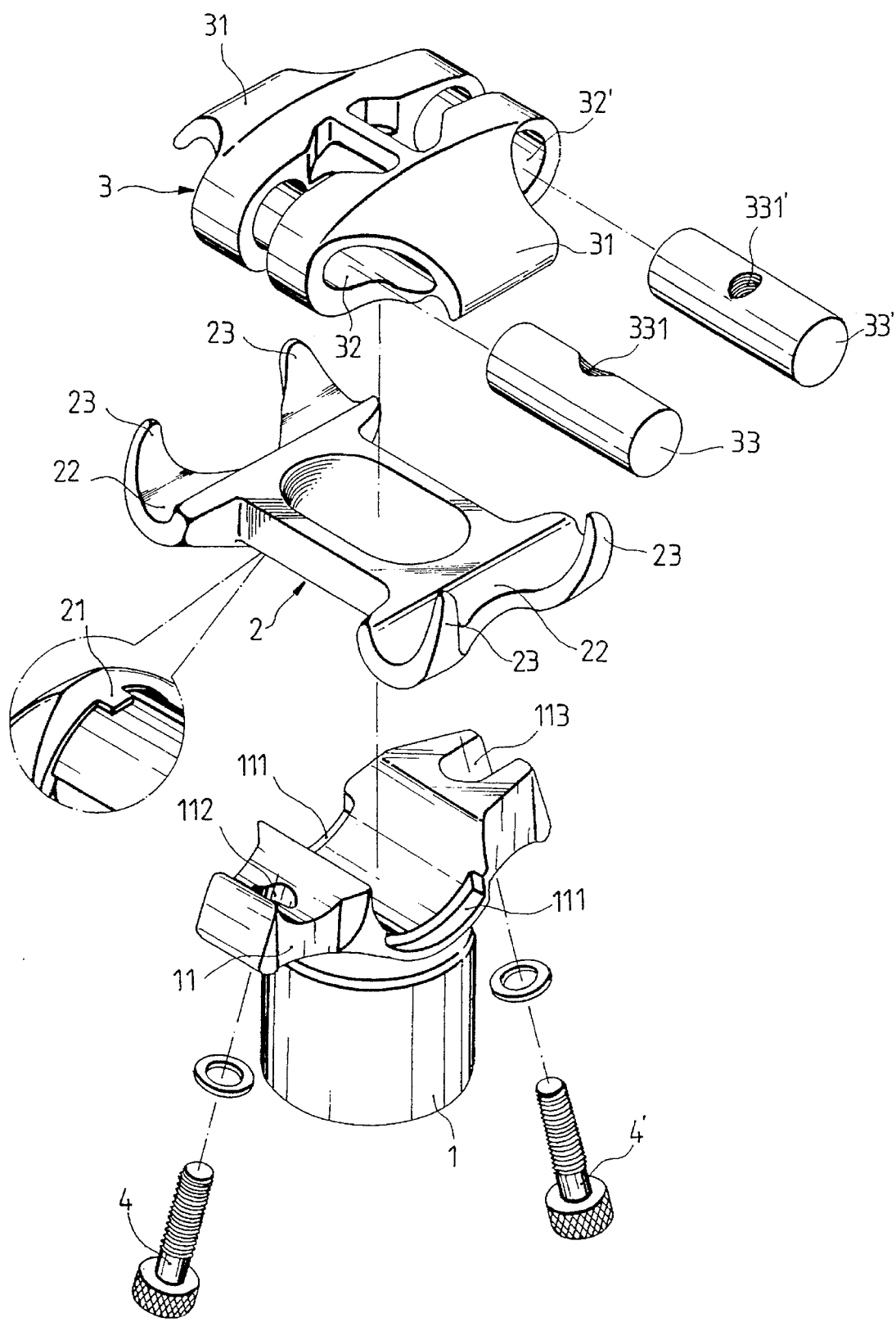
FIG 1 is a perspective exploded view of the present invention.
Figure 2:
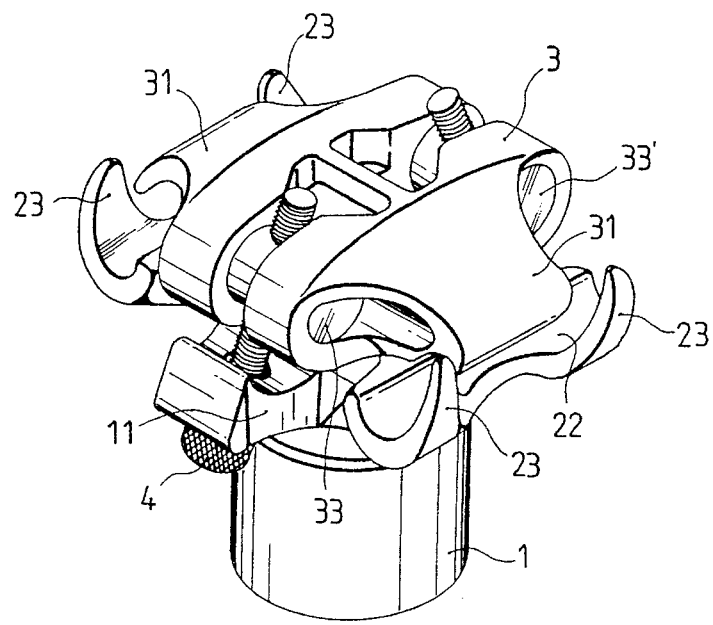
FIG. 2 is a perspective view of the assembly of the present invention.

As shown in FIG. 1 and FIG. 2, the present invention aims at improving the saddle adjustment structure above the seat post to allow greater ease and convenience in assembling or adjusting the saddle. The present invention includes a seat post (1), a lower clamp (2), an upper clamp (3), and a pair of bolts (4) and (4'). Its features are described as follows:

A base (11) is installed on the top of the seat post (1). At the center of the base (11) is a curved slot. The two sides of the curved slot are each extended by a curved recess (111). The protruding sides of the front and rear positions of the base (11) contain a hole (112) and an open slot (113) respectively.

The lower clamp (2) is H-shaped with a curved bottom at the center for engaging the curved slot at the center of the base (11). The curved bottom of lower clamp (2) includes a pair of keys (21) extending inwardly from opposed sides. On the other hand, a slotted flange (22) with front and rear parts curving upward extends from both sides of the lower clamp.

The upper clamp (3) is also H-shaped with a curved top surface at its center. Its two sides are extended by a slotted flange (31) curving downward, whereas its front and rear parts contain axial holes (32) and (32') respectively. At the center of each axial hole is an open slot. Axles (33) and (33') with central threaded holes (331) and (331') are inserted in the axial holes (32) and (32') respectively.

Figure 3:
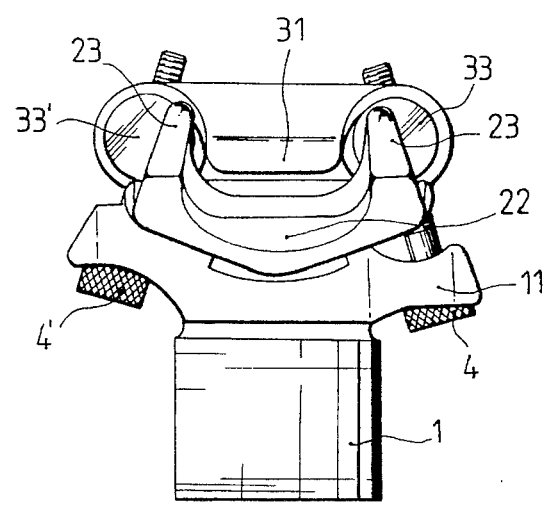
FIG. 3 is a side elevational view of the assembly of the present invention.

The above mentioned components are structured to fit the curved surface of the lower clamp (2) into the curved slot at the center of the base (11) in such a way that each key (21) is locked into a curved recess (111). The upper clamp (3) is then fitted with the lower clamp (2). A bolt (4) is screwed through the hole (112) of the base (11) into the threaded hole (331) of the axle (33) inserted into the axial hole (32) of the upper clamp (3). Another bolt (4') is threaded through the open slot (113) of the base (11) into the threaded hole (331') of the axle (33') inserted into the axial hole (32') on the other edge of the upper clamp (3). As shown in FIG. 3, this secures the upper and lower clamps (2) and (3) tightly on the base (11).

Figure 4:
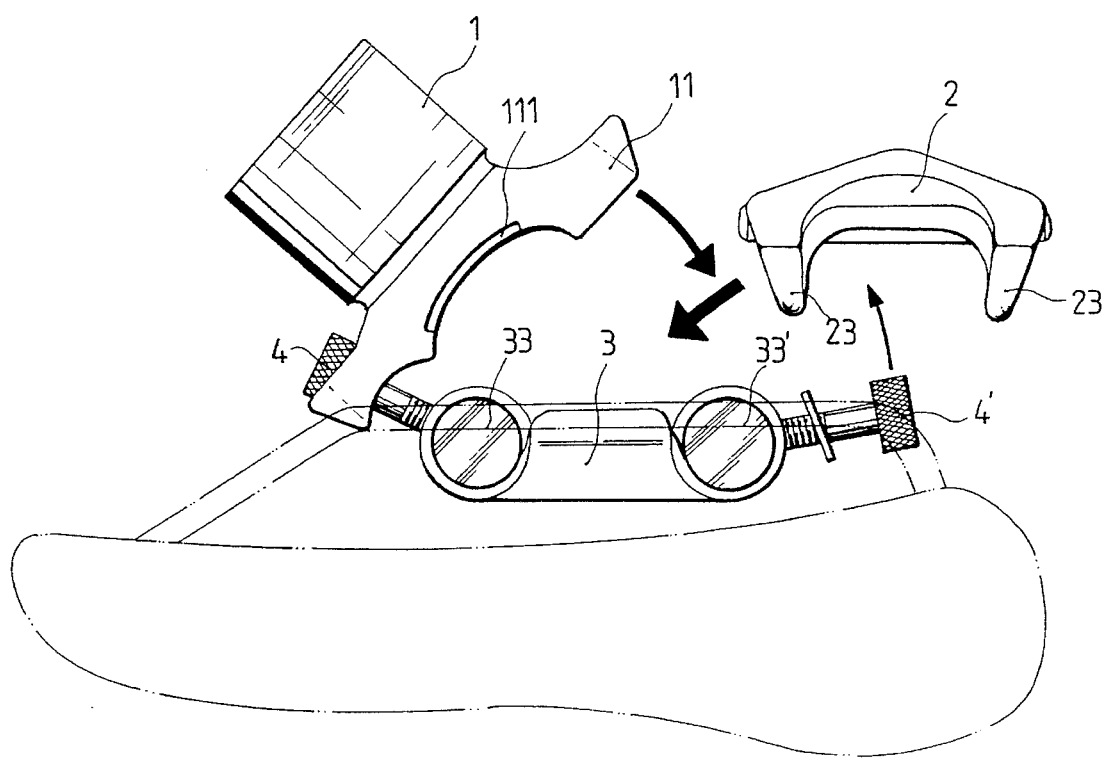
FIG. 4 is a diagrammatic view showing the operation of the present invention.
Figure 5:
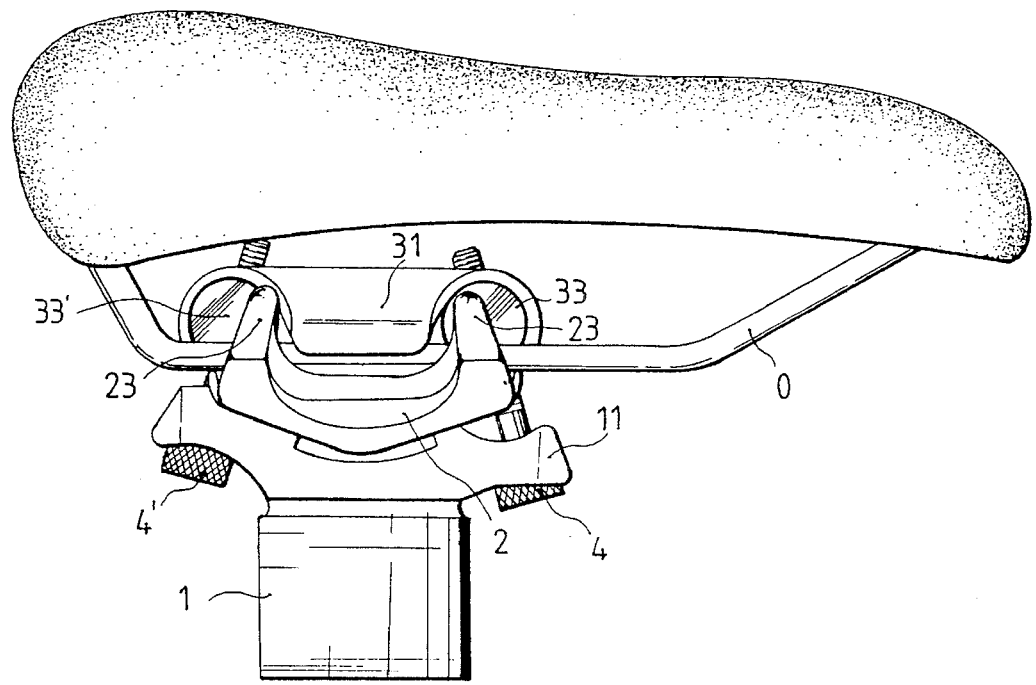
FIG. 5 is a side elevational view showing the present invention with a bicycle saddle mounted thereon.

Given this design, a cyclist can start assembling the saddle by turning the seat post (1) upside down to loosen the bolt (4') in the open slot (113) to release the bolt (4') from the open slot (113), as seen in FIG 4. As a result, the axle (33) between the base (11) and the upper clamp (3) is disengaged. The lower clamp (2) is then taken away. The rails (0) underneath the saddle are clamped in the curved slots of the flanges (31) on two sides of the upper clamp (3). The lower clamp (2) is positioned above the upper clamp (3). The rails (0) are fitted inside the curved slots of the flanges (22). As a result, the lower and upper clamps (2) and (3) fix the rails (0) between flanges (31) and (22). To finish the assembly, the bolt (4') is brought back into the open slot (113) again and fastened tightly.

Figure 6:
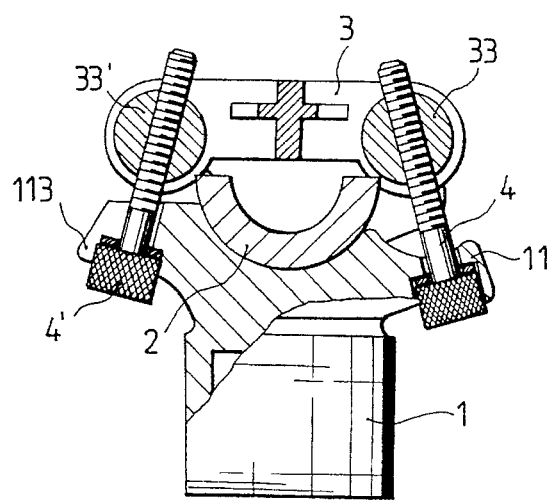
FIG. 6 is a sectional view of the assembly of the present invention.

To adjust the saddle tilt, the bolts (4) and (4') in the hole and in the open slot (113) of the base (11) can be loosened. Since the keys (21) are restricted by the curved recesses (111), the for-and-aft adjustment of the saddle can be made properly. The bolts (4) and (4') are screwed tightly after proper seat adjustment (see FIG. 6) to finish the adjustment process.

The present structural design and assembly is reasonably simple and enables easy and convenient upward-and-downward angle adjustment of the saddle. It is also more practical and provides cost advantage to manufacturers.

Although the invention has been described in its preferred form with a certain degree of particularity it is understood that the present disclosure of the preferred form has been made only by way of example and numerous changes in the details of construction and the combination and arrangement of parts may be resorted to without departing from the spirit and the scope of the invention as hereinafter claimed. It is intended that the patent shall cover, by suitable expression in the appended claims, whatever features of patentable novelty exists in the invention disclosed.

What is claimed is:

1. A bicycle saddle adjustment structure comprising:

a) a seat post including a top portion, a base on the top portion, the base including a central curved slot having a pair of opposed sides, a curved recess extending outwardly from each side, a front protruding side provided with a hole therethrough, and a rear protruding side provided with an open slot therein;

b) an H-shaped lower clamp having a central curved bottom engagable with the curved slot of the base, a pair of opposed sides, an upwardly curved slotted flange on each side, and a pair of inwardly directed opposed keys at the curved bottom for engagement with the curved recesses of the base;

c) an H-shaped upper clamp including a central curved top surface, a pair of opposed sides, a downwardly curved slotted flange at each side, a front portion including an open slot and an axle hole, a rear portion including an open slot and an axle hole, a pair of axles receivable within the axle holes, and each axle having a threaded hole formed therein; and d) a pair of threaded bolts engageable through the hole and open slot of the base and threadedly engageable with the threaded holes of the axles for securing the upper and lower clamps to the base and the rails of a saddle between the upwardly curved slotted flanges of the lower clamp and the downwardly curved slotted flanges of the upper clamp.

* * * * *